US007634289B2

(12) United States Patent
Gervais et al.

(10) Patent No.: US 7,634,289 B2
(45) Date of Patent: Dec. 15, 2009

(54) METHOD FOR CONTROLLING TRANSMISSION POWER ON COMMUNICATION CHANNELS AND BASE STATION TO IMPLEMENT THE METHOD

(75) Inventors: Aurélie Gervais, Paris (FR); Bastien Massie, Paris (FR); Arnauld Taffin, Bures-sur-Yvette (FR)

(73) Assignee: Alcatel Lucent, Paris (FR)

( * ) Notice: Subject to any disclaimer, the term of this patent is extended or adjusted under 35 U.S.C. 154(b) by 580 days.

(21) Appl. No.: 11/114,809

(22) Filed: Apr. 26, 2005

(65) Prior Publication Data

US 2006/0240859 A1 Oct. 26, 2006

(30) Foreign Application Priority Data

Apr. 26, 2004 (FR) .................................. 04 04393

(51) Int. Cl.
*H04B 7/00* (2006.01)
*H04Q 7/20* (2006.01)
(52) U.S. Cl. ..................... 455/522; 455/13.4; 455/69; 455/515; 370/318
(58) Field of Classification Search ................ 370/318, 370/252, 253, 277, 278, 333; 455/69, 13.4, 455/511, 515, 522, 67.11, 115.1, 126, 127.1, 455/161.3
See application file for complete search history.

(56) References Cited

U.S. PATENT DOCUMENTS

| 7,324,828 | B2* | 1/2008 | Nagaoka et al. ............. 455/522 |
| 2003/1039217 | | 2/2003 | Seo et al. |
| 2004/0100911 | A1* | 5/2004 | Kwan et al. ................. 370/252 |
| 2006/0050637 | A1* | 3/2006 | Wigard et al. ............... 370/230 |
| 2006/0198338 | A1* | 9/2006 | Ishii et al. .................. 370/329 |
| 2006/0256732 | A1* | 11/2006 | Hamalainen ................ 370/252 |

OTHER PUBLICATIONS

"3rd Generation Partnership Project, Technical Specification Group Radio Access Network, Physical Channels and Mapping of Transport Channels Onto Physical Channels, FDD, release 6", 3GPP TS 25211 V6.0.0, Dec. 2003, pp. 1-51, XP002316690, p. 10, section 5.2.1-p. 13.
Ghosh, A. et al. "Control Channel Design for High Speed Downlink Shared Channel for 3GPP W-CDMA" Vehicular Technology Conference; The 57th IEEE Semianual, vol. 3, Mar. 2003, pp. 2085-2089, XP002316691.
"3rd Generation Partnership Project, Technical Specification Group Radio Access Network, Physical Layer Procedures, FDD" 3GPP TS 25214 (Dec. 2003), pp. 1-64, XP002316692 p. 37, section 6A.1.
3rd Generation Partnership Project, Technical Specification Group Radio Access Network, High Speed Downlink Packet Access HSDPA; Overall Descripton; Stage 2 3GPP TS 25308 (Mar. 2003).

* cited by examiner

*Primary Examiner*—Sujatha Sharma
(74) *Attorney, Agent, or Firm*—Sughrue Mion, PLLC

(57) ABSTRACT

A base station transmits blocks, in successive transmission time intervals, to radio terminals, over communication channels shared between the radio terminals comprising traffic channels and control channels associated with traffic channels, some of the transmitted blocks being positively or negatively acknowledged by the radio terminals. With regard to a radio terminal:
a quality indication relative to said traffic channel is determined;
a quantity relative to acknowledgements transmitted to the base station beforehand is determined;
a transmission power on the traffic channel and/or the associated control channel is calculated, for the next corresponding transmission time interval, from said quality indication and said quantity relative to acknowledgements.

42 Claims, 5 Drawing Sheets

METHOD FOR CONTROLLING TRANSMISSION POWER ON COMMUNICATION CHANNELS AND BASE STATION TO IMPLEMENT THE METHOD

BACKGROUND OF THE INVENTION

The present invention relates to the control of transmission power on communication channels in a radiocommunication system. More particularly, it relates to power control for certain communication channels useful for implementing high-speed data transmissions.

Power control procedures are known for radiocommunication systems, such as the GSM system ("Global System for Mobile communications") or the UMTS system ("Universal Mobile Telecommunication System"). Their purpose is to improve performance for the reception of transmitted information, while limiting the risks of interference.

Power control is particularly sensitive when applied to data transmission channels which allow a high throughput, since a power that is too weak on such channels may cause a high error rate in the transmission, which is detrimental to the throughput offered. This is equally the case with control channels associated with a high-speed data transmission channel, since a power that is too weak on such channels may cause poor monitoring of the associated data transmission channel and therefore loss of useful information.

UMTS offers a high-speed data transmission functionality, referred to as HSDPA ("High Speed Downlink Packet Access"). An overview of this functionality may be found in the technical specification entitled 3GPP TS 25.308, Release 5, version 5.4.0, published in December 2003 by the 3GPP ("$3^{rd}$ Generation Partnership Project").

HSDPA provides for the use of shared downlink transport channels, referred to as HS-DSCH ("High Speed-Downlink Shared CHannel"), multiplexed on physical channels HS-PDSCH ("High Speed-Physical Downlink Shared CHannel"), which enable a base station to transmit to high-speed data terminals. The terminals forward counter-response information to the base station, particularly acknowledgements and indications linked to the quality of the downlink transmissions, on dedicated uplink channels, referred to as HS-DPCCH ("High Speed-Dedicated Physical Control CHannel").

For an HS-DSCH channel, one or more specific shared physical control channels, referred to as HS-SCCH ("High Speed-Shared Control CHannel") must be provided. The signaling information carried by the HS-SCCHs identify the destination terminals for the blocks transmitted on the HS-DSCHs, and provide them with a certain number of indications which are useful for the reception of these blocks.

A base station implementing high-speed data transmission according to the HSDPA functionality distributes a power between the HS-PDSCH and HS-SCCH channels. The power to be distributed among the HSDPA downlink channels is typically the power remaining when a transmission power has been allocated to all of the dedicated and shared downlink channels.

Technical specification TS 25.214, version 5.7.0, Release 5, "Universal Mobile Telecommunications System (UMTS); Physical layer procedures (FDD)", published in December 2003 by the 3GPP, specifies that the transmission power on the HS-SCCH can be defined by applying a margin in relation to the transmission power on a dedicated channel known as DPCCH ("Dedicated Physical Control CHannel"). However, this margin is defined in an optional manner, and so it must also be possible to control the power of the HS-SCCH channel in a different manner.

As far as the HS-PDSCH channels are concerned, nothing is specified to control their transmission power.

One object of the present invention is to avoid loss of information and a limitation of performance relative to certain communication channels, such as the HS-PDSCH and HS-SCCH channels.

Another object of the invention is to control the transmission power on certain shared communication channels, such as the HS-PDSCH and HS-SCCH channels, in an effective and appropriate manner.

SUMMARY OF THE INVENTION

The invention therefore proposes a method for controlling transmission power on communication channels in a radiocommunication system which comprises at least one base station designed to transmit, in successive transmission time intervals, blocks destined for radio terminals, on communication channels shared among the radio terminals, the shared communication channels comprising traffic channels and control channels associated with traffic channels, whereby at least some of the blocks transmitted by the base station produce positive or negative acknowledgements from the radio terminals. The method comprises the following steps in relation to a radio terminal which is capable of receiving blocks on at least one traffic channel and one control channel associated with said traffic channel, during a next corresponding transmission time interval for each channel:

determining at least one quality indication relating to said traffic channel;

determining at least one quantity relating to acknowledgements previously transmitted to the base station; and calculating a transmission power on at least one of the traffic channel or the control channel associated with said traffic channel, for said next corresponding transmission time interval, from said quality indication relating to the traffic channel and said quantity relating to acknowledgements previously transmitted to the base station.

A power control of this type can be applied, for example, to traffic channels of the HS-DSCH type and/or HS-SCCH control channels associated with one or more HS-DSCH channels.

In particular, it avoids the need to regulate the transmission power according to the power on a different DPCCH dedicated channel.

Moreover, even if the quality indication relating to said traffic channel results from the supply of information from the radio terminal concerned, it is guaranteed that the transmission power finally calculated is relatively reliable since it also takes account of information relating to an acknowledgement mechanism. Thus, even if the information supplied to the base station differs in value between different radio terminals, the calculated power guarantees a certain level of quality of service for each of these terminals on the basis of the acknowledgements returned.

It must be noted that the determination of the quality indication relating to said traffic channel and the determination of the quantity relating to acknowledgements previously transmitted to the base station may be carried out in any order. The determination of the quality indication relating to said traffic channel may even take account of the determined quantity relating to acknowledgements previously transmitted to the base station.

The power calculated for each channel considered over a corresponding transmission time interval is selected in such a way that the sum of the transmission powers for shared channels over this transmission time interval is less than a predetermined power, for example a power remaining in the base station following allocation of power to the communication channels already assigned.

For example, a transmission power can first be calculated for a control channel over a corresponding transmission time interval, then for an associated traffic channel over a corresponding transmission time interval, taking account of the power already allocated to the control channel. If the two transmission time intervals considered remain discrete, the transmission power calculated for the control channel, for example, advantageously takes account of the power already allocated to the traffic channel(s) over the corresponding preceding transmission time interval.

The transmission power for a control channel is, for example, calculated by applying a margin in relation to a power of a pilot channel with a predetermined power. The transmission power for a traffic channel is, for example, calculated by applying a margin in relation to a reference power.

The number of physical channels on which the traffic channel is to be multiplexed over a next transmission time interval can also be derived from said quality indication relating to said traffic channel. The transmission power calculated for the traffic channel is then advantageously distributed uniformly among the different physical channels over said next transmission time interval.

The invention moreover proposes a base station designed to transmit, in successive transmission time intervals, blocks destined for radio terminals, on communication channels shared among the radio terminals, the shared communication channels comprising traffic channels and control channels associated with traffic channels, whereby at least some of the blocks transmitted by the base station produce positive or negative acknowledgements from the radio terminals. The base station is designed to implement a transmission power control on at least some of said shared communication channels according to the aforementioned method.

The invention also proposes a computer program product to be installed in a base station, comprising instructions to carry out the aforementioned method during an execution of the program by means of the base station.

DESCRIPTION OF PREFERRED EMBODIMENTS

Figure 1:
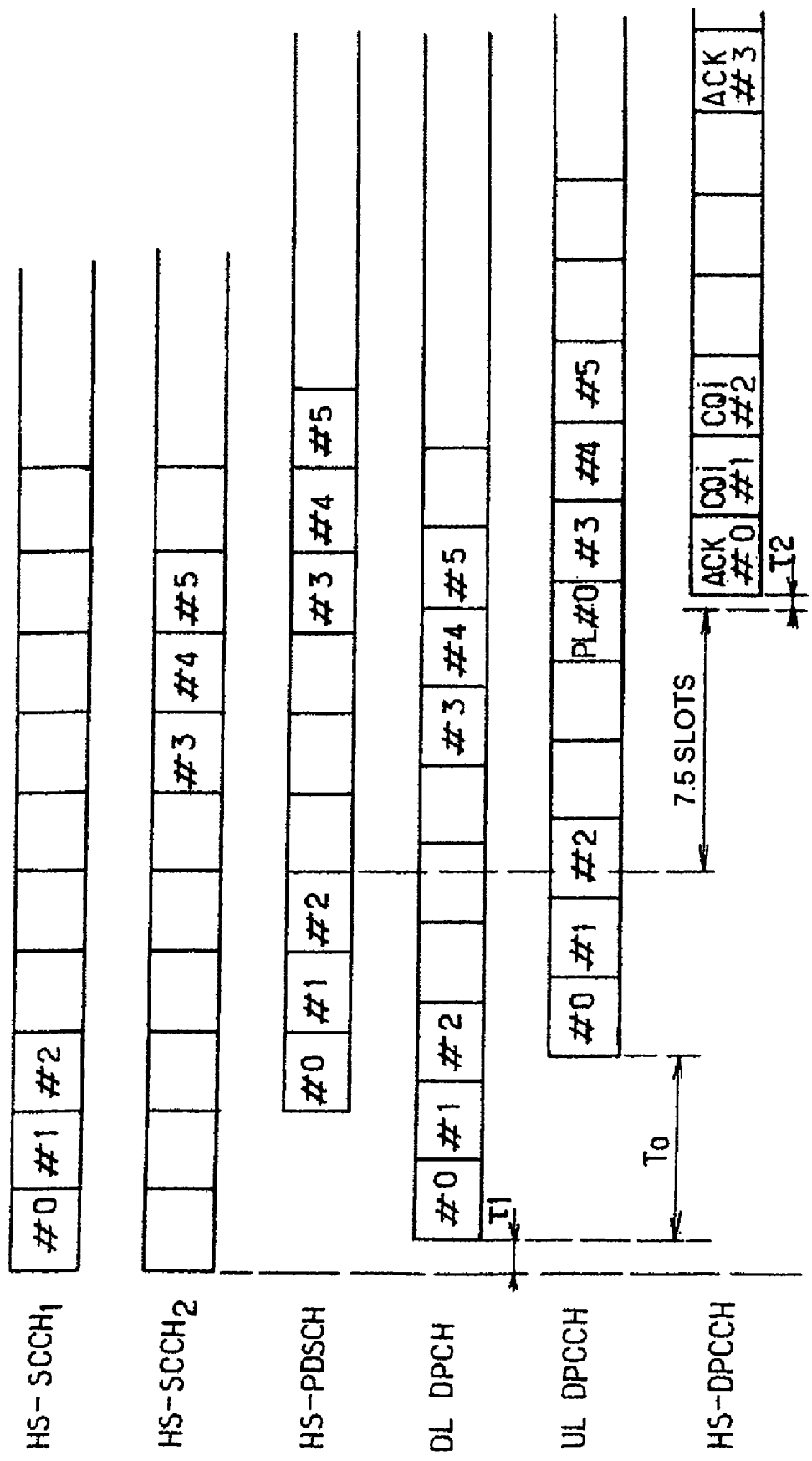
FIG. 1 is a temporal representation showing the main radio channels used in the context of the HSDPA functionality.

In the present description, the invention will be described more particularly in its non-limiting application to third-generation radiocommunication networks of the UMTS type in FDD ("Frequency Division Duplex") mode.

UMTS is a radiocommunication system using Code-Division Multiple Access (CDMA), i.e. the transmitted symbols are multiplied by spreading codes comprising samples referred to as "chips", whose output rate (3.84 Mchip/s in the case of UMTS) is higher than that of the transmitted symbols. The spreading codes distinguish different physical channels (PhCH) which are superimposed on the same transmission resource composed of a carrier frequency. The autocorrelation and intercorrelation properties of the spreading codes enable the receiver to separate the PhCHs and extract the symbols which are intended for it. For UMTS in FDD mode on the downlink, a scrambling code is allocated to each cell and different physical channels used by this cell are distinguished by mutually orthogonal "channelization" codes. For each PhCH, the global spreading code is the product of the "channelization" code and of the scrambling code of the cell. The spreading factor (equal to the ratio between the output rate of the chips and the output rate of the symbols) is a power of 2 between 4 and 512. This factor is selected according to the throughput of the symbols which are to be transmitted on the PhCH.

In this case, the HSDPA functionality mentioned above is then used. HSDPA enables the transmission by a base station of high-speed data for a set of terminals located in the coverage zone of the base station. It uses a high-speed shared downlink transport channel: the HS-DSCH ("High Speed-Downlink Shared CHannel"). In FDD mode, which is of particular interest in the present description, the characteristics of this channel are, in particular:

(i) a subframe, or transmission time interval, of 2 ms corresponding to 3 time slots of 666 µs;
(ii) hybrid data retransmission request processes of the HARQ type ("Hybrid Automatic Repeat reQuest"); and
(iii) a link adaptation mechanism.

In the access network, part of the Medium Access Control (MAC) protocol layer, the MAC-hs, is located in the base station. A high speed is therefore offered on this channel. For the same reason, the HS-PDSCH uses a relatively low spreading factor, equal to 16. In a given cell and for a given scrambling code, up to 15 HS-PDSCH channels can be set up using orthogonal "channelization" codes, whereby only one HS-DSCH can be allocated to one user.

The HS-DSCH transport channel is carried by one or more HS-PDSCH physical channels. The latter do not support soft handover mode, since the high-speed transmission mechanisms assume communication with a single base station.

For one HS-DSCH channel, one or more specific shared physical control channels must be provided, referred to as HS-SCCH ("High Speed-Shared Control Channel"). The signaling information carried by the HS-SCCHs identifies the destination terminals for the blocks transmitted on the HS-DSCHs, and provides them with a certain number of indications which are useful for reception of these blocks:

a Transport Format and Resource Indicator (TFRI), providing the information on the format of the dynamic part of the HS-DSCH channel, in particular for the modulation scheme used, the size of the transport block and the allocated physical resources ("channelization" codes);

information linked to the HARQ protocol, in particular the redundancy version, an HARQ process identifier, and a new data block indicator.

An HS-SCCH channel uses a spreading factor of 128, with a subframe identical to that of the HS-DSCH (3 slots of 666 µs). All the HS-PDSCHs transmitted by a base station are time-aligned and the synchronization of the HS-SCCHs is moved forward two slots (1333 µs) in relation to that of the associated HS-PDSCHs, as shown in FIG. 1. This allows the destination terminal for a data block transmitted on an HS-PDSCH in a 2 ms HSDPA subframe to know the information required in order to receive it. Some information contained in the TFRI, i.e. the allocated codes and the modulation used, is essential to the terminals since it allows them to begin to demodulate the relevant HS-PDSCH(s). This is why this information from the TFRI is included in the first slot of each subframe on the HS-SCCH. Thus, a high-speed decoding of the HS-SCCH allows a terminal to read the contents of the HS-PDSCH in the next subframe without loss of information.

A dedicated uplink channel is also defined in the HSDPA functionality: the HS-DPCCH (High Speed-Dedicated Physical Control CHannel"). It allows the terminal involved in an HSDPA transmission to return counter-response information to the base station carrying the HS-PDSCH channel. This counter-response information comprises in particular the positive or negative acknowledgements of the HARQ protocol and measures which are useful for link adaptation.

In particular, the terminal periodically forwards a formatting request to the base station, based on an estimation of the signal-to-noise ratio of the downlink, referred to as CQI ("Channel Quality Indicator"). The CQI parameter is coded on 31 levels, the interval between two levels corresponding to an interval of approximately 1 dB in the signal-to-noise ratio. A data formatting format, comprising a modulation scheme, a number of codes which can be received simultaneously by the terminal in a TTI, and the size of the information block corresponds to each CQI value. This correspondence is typically stored in a predefined table stored in the base station. The link adaptation mechanism makes use of the supplied CQI values in order to choose a transmission format on the HS-DSCH channel in such a way as to guarantee, with a certain level of probability, a decoding of the data by the terminal (an error rate of 10% is typically envisaged in the decoding of the first transmission).

In more detail, the HS-DPCCH uses a subframe structure, the duration of which is equivalent to that of one subframe, i.e. 2 ms, with a spreading factor equal to 256. Each HS-DPCCH subframe is composed of a first field of 2560 chips (10 symbols), containing the acknowledgements of the HARQ protocol (field denoted as "ACK" in FIG. 1). The last 5120 chips (20 symbols) are not systematically transmitted to each subframe. If they are, they contain the CQI field providing indications of the quality of the HSDPA downlink. The HS-DPCCH is not continuously transmitted. This is the case in particular in periods in which no information is transmitted to the terminal on the HS-PDSCH shared channel.

FIG. 1 shows a temporal representation of the main channels used between a base station and a terminal involved in HSDPA communication. Following despreading and decoding of the signal received on four HS-SCCH channels (only two of which are shown in FIG. 1), the latter identifies the HS-PDSCH channel on which the base station possibly sends it high-speed data with an offset of two time slots. This transmission is shown in the figure in time slots #0, #1 and #2.

Furthermore, dedicated channels are also used: the downlink channel DL_DPCH which is offset in relation to the HS-SCCHs by a time $\tau_1$ and the uplink channel UL_DPCH with a time offset $T_0$, corresponding to around 1024 chips, in relation to the DL_DPCH, to which twice the propagation time between the base station and the terminal is added (not shown in FIG. 1). Finally, for the uplink channel HS-DPCCH, the first subframe or time slot #0 of 2 ms is offset in relation to the end of time slot #2 of the HS-PDSCH. This offset corresponds to 7.5 time slots (i.e. 5 ms), to which a time adjustment $\tau_2$ is added in order to retain the orthogonality between the codes of the HS-DPCCH and the UL_DPCCH, whereby this adjustment entails rendering the offset between these two channels as a multiple of the duration of 256 chips.

In the example shown in FIG. 1, a second HSDPA transmission is indicated to the terminal by a different HS-SCCH channel. It is denoted as the time slot indices #3, #4 and #5. The transmission then takes place on an HS-PDSCH channel which may be the same as for the first transmission, as is the case in FIG. 1, or else on one or more other HS-PDSCHs of the base station concerned.

It can be observed that, in the example shown in FIG. 1, the second HSDPA transmission is subject to an acknowledgement on a subframe of the HS-DPCCH, but that the CQI is not transmitted for this second transmission. Moreover, the period of silence on the HSDPA downlink channels between the two transmissions shown entails an absence of transmission of a new acknowledgement by the terminal concerned on its HS-DPCCH dedicated channel, even if the terminal may exploit this silence to repeat acknowledgement indications.

Figure 2:
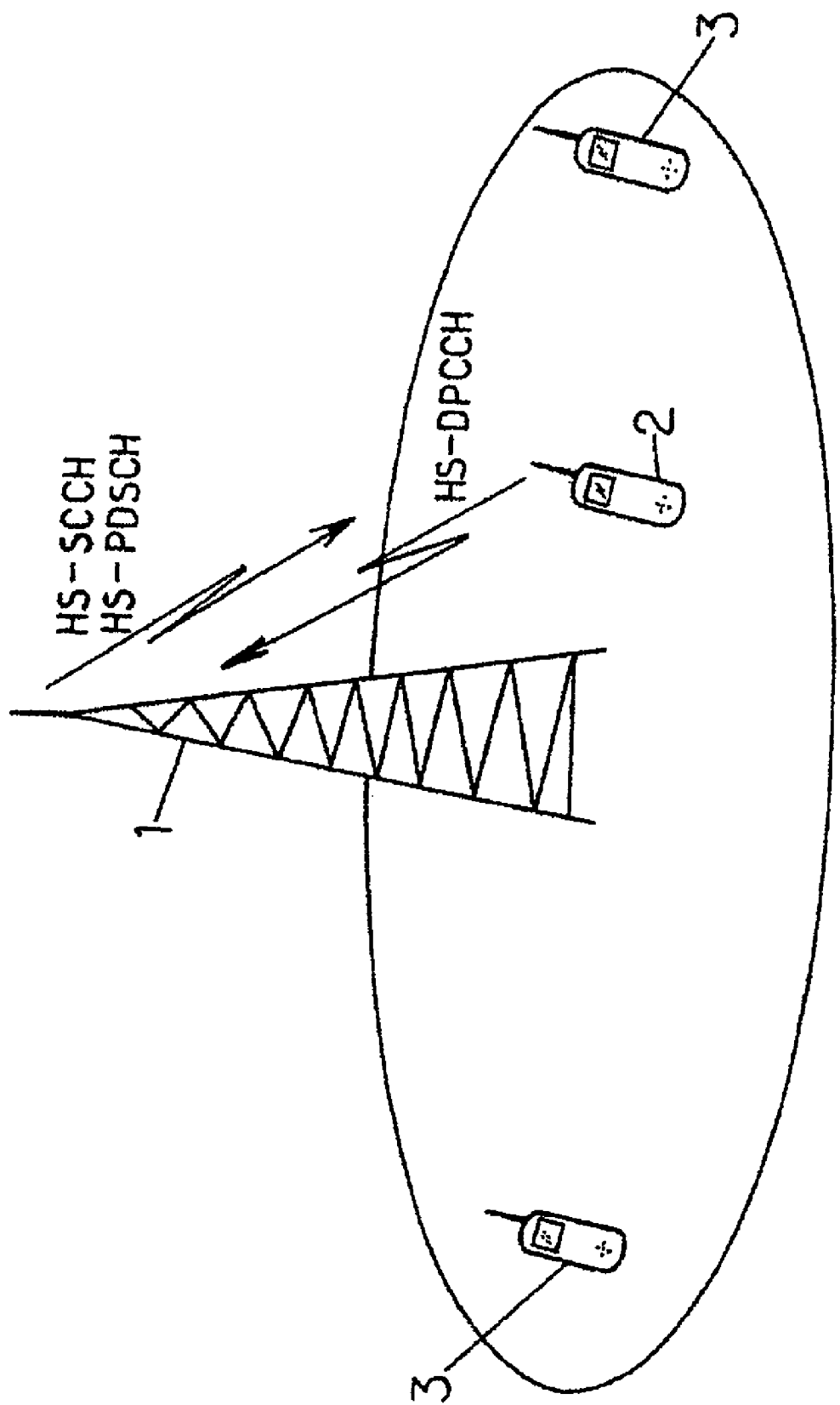
FIG. 2 is a diagram showing a base station capable of communicating with radio terminals according to the HSDPA functionality.

FIG. 2 shows a base station 1 suitable for transmitting high-speed data to radio terminals or UE ("User Equipment") 2 and 3, according to the HSDPA functionality. An allocation of HSDPA resources is implemented by the base station 1. At the time considered in FIG. 2, the base station 1 indicates to the UE 2, on an HS-SCCH channel, that it is about to receive data on one or more HS-PDSCH channels. The UE 2, for its part, has an HS-DPCCH uplink channel as described above. According to the allocation mode implemented by the base station 1, one or more UE 3s will be able to receive data on one or more PDSCH channels from the base station 1 during a subsequent transmission time interval, or the UE 2 will possibly continue to receive HSDPA data during the following transmission time interval, possibly as well as one or more other UE 3s.

As well as the allocation of shared resources, the base station 1 must control the transmission power on the channels implemented in the context of the HSDPA functionality, in particular the HS-SCCH and HS-PDSCH channels. To do this, it has a predetermined maximum power which is to be used to transmit these channels. This maximum power can be a fixed value. It can also represent the power remaining in the base station once a transmission power has been allocated to the communication channels already assigned. These channels comprise, for example, the dedicated or shared channels which are used by the base station. If power has already been allocated to the HSDPA channels for certain terminals, this power is also advantageously taken into account in order to allocate power to the HSDPA channels in relation to a different terminal for the same transmission time interval.

According to the notations used in FIG. 2, a transmission intended for the UE 2 will be carried out from the base station 1 on an HS-SCCH channel and an HS-PDSCH channel, if the power remaining in the base station is sufficient to implement it. If not, the transmission to the UE 2 will not be able to take place. Moreover, an adequate transmission power must be selected for each of these channels.

It is therefore proposed below to calculate the transmission power for an HS-SCCH channel, then for the HS-PDSCH channel(s), assuming that the sum of the calculated powers must not exceed the power remaining in the base station, otherwise the UE concerned will not be served. It is also possible to calculate the transmission power on the HS-PDSCHs before deriving a power for the associated HS-SCCH therefrom.

Moreover, it must be noted that, due to the time offset of two slots between an HS-SCCH and the associated HS-PDSCHs, the sum of the calculated powers must be less than the power remaining in the base station in the two subframes corresponding to respective transmission time intervals for each of the channels. With reference to FIG. 1, this means that the cumulative transmission power on the HS-SCCH and HS-PDSCH channels for the user concerned must be less than the power remaining in the base station in the time interval covered by slots #0, #1 and #2 of the HS-SCCH$_1$ channel, for example (this power is denoted as P$_{HSDPA\_control}$), but also in the time interval covered by slots #0, #1 and #2 of the HS-PDSCH channel (this power is denoted as P$_{HSDPA}$), i.e. over five consecutive time slots in total. In practice, if a transmission power relative to an HS-SCCH channel is first calculated, this calculation advantageously takes account of the transmission power previously calculated over the preceding transmission time interval of the HS-PDSCH channels.

Below, the non-limiting choice is made to calculate a power for the HS-SCCH channel in the first instance, followed by the associated HS-PDSCH channel(s).

Figure 3:
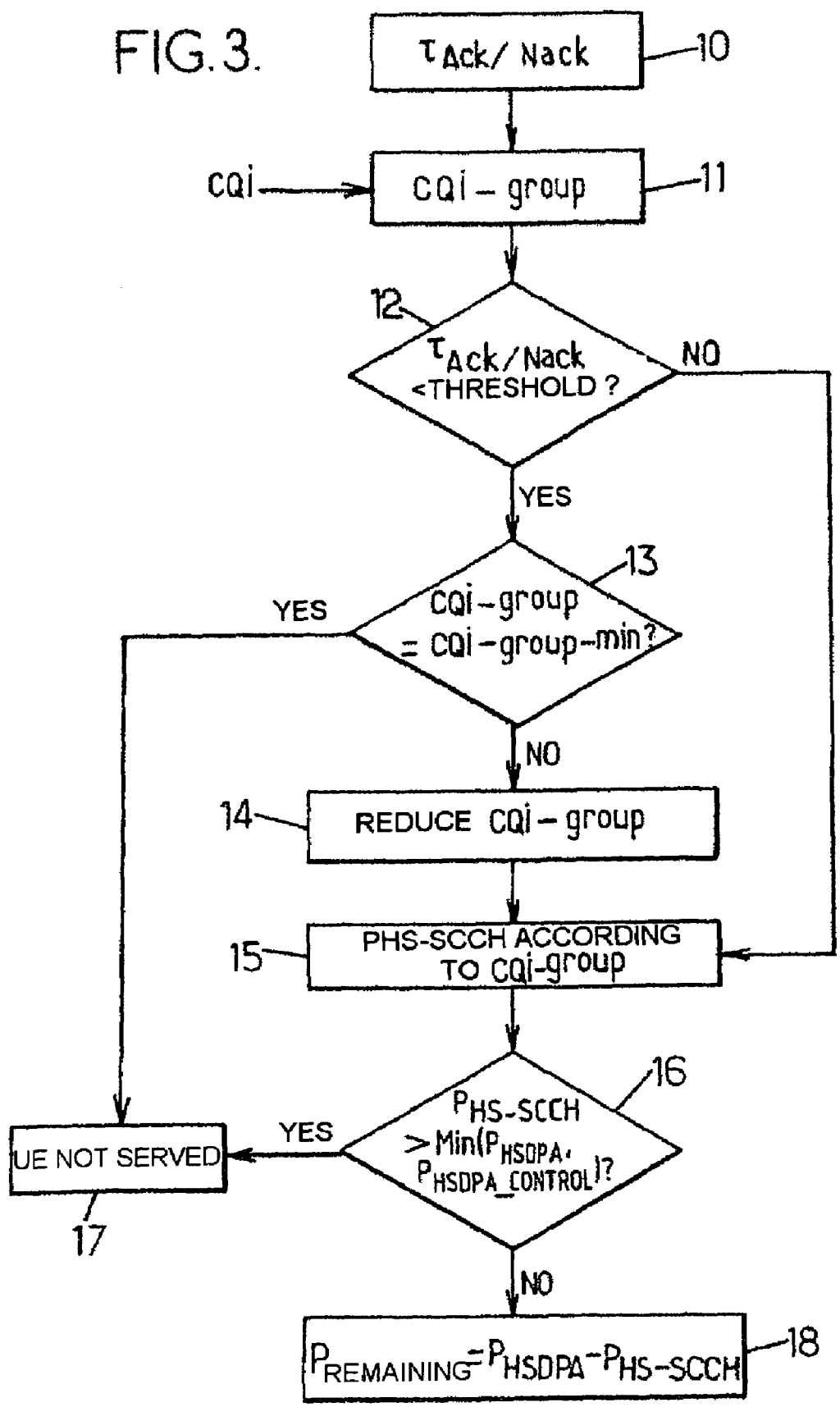
FIG. 3 is a flow chart showing a method for controlling the power on an HS-SCCH channel according to the invention.

FIG. 3 shows a method for calculating power for the HS-SCCH channel in relation to a UE according to the invention. This calculation is carried out, for example, by the base station 1 in relation to the UE 2 shown in FIG. 2. The transmission power P$_{HS-SCCH}$ to be calculated for the HS-SCCH for a subsequent transmission time interval destined for the UE 2 takes account of a CQI calculation. In fact, the lower the CQI supplied to the base station 1 by the UE 2, the poorer the corresponding propagation channel, and therefore the greater the power to be supplied will be in order to compensate for the poor quality of the channel. The CQI values are moreover advantageously classified by CQI groups ("CQI_group"). The correspondence between a set of CQI values and a CQI_group is stored in the base station 1.

One possibility would be to derive from the CQI_group obtained in relation to the UE 2, i.e. indirectly from the CQI, a power margin to be added to the power on a pilot channel referred to as CPICH ("Common Pilot Channel"). This channel carries a pilot signal, or marker signal, formed from a predetermined sequence of symbols (see technical specification 3G TS 25.211, "Physical channels and mapping of transport channels onto physical channels (FDD)", version 3.3.0 published in June 2000 by the 3GPP). This signal is transmitted by the base station 1 on the primary scrambling code of the cell, with a determined channel code.

However, this method of calculation is not entirely satisfactory, since the CQI is not calculated in a uniform manner by the radio terminals, and so determination of power based solely on the CQI could result in functional disparities.

According to the embodiment shown in FIG. 3, a statistical value is calculated in relation to the acknowledgement mechanism described above (step 10). This value may, for example, be a mean rate $\tau_{Ack/Nack}$ of positive or negative acknowledgements previously received at the base station 1 on an HS-DPCCH channel from the UE 2. This rate enables the proportion of acknowledgements received at the base station 1 to be estimated in relation to the acknowledgements expected by the base station 1 following a previous transmission, but which said base station has not received. In fact, the absence of either a positive (Ack) or negative (Nack) acknowledgement may be considered as an indication that the UE 2 has not succeeded in detecting information which was intended for it on the HS-SCCH channel, since the power of said channel was too weak, and therefore the UE 2 has not succeeded in monitoring the associated HS-DSCH channel in the time required.

The mean rate $\tau_{Ack/Nack}$ is calculated over a sufficiently representative observation period, for example thanks to a sliding observation window mechanism. It must be noted that, in an equivalent variant of this embodiment, the estimated mean rate is a rate $\tau_{DTX}$ corresponding to the proportion of acknowledgements not received at the base station 1, whereas these were expected by said base station (i.e. $\tau_{DTX}=1-\tau_{Ack/Nack}$).

In step 11, as indicated above, a CQI_group is derived according to the CQI values supplied by the UE 2, possibly over the same observation period as for $\tau_{Ack/Nack}$. It must be noted that this step 11 could also be implemented before step 10.

In step 12, the value of $\tau_{Ack/Nack}$ is compared with a predetermined threshold. If $\tau_{Ack/Nack}$ is greater than said threshold, this means that the mean rate of acknowledgements received at the base station 1 is satisfactory, and therefore that the HS-SCCH channel is indeed received by the UE 2. The power of the HS-SCCH is therefore calculated on the basis of the CQI_group information obtained (see the description of step 15 below).

On the other hand, if $\tau_{Ack/Nack}$ is less than said threshold, this means that the mean rate of acknowledgements received at the base station 1 is too low, and therefore that a large amount of information carried by the HS-SCCH and destined for the UE 2 is not detected by the latter. In this case, it is therefore expedient to increase the transmission power of the HS-SCCH in order to improve the detection of this channel by the UE 2.

For this purpose, the CQI_group previously obtained is reduced, i.e. the CQI values supplied by the UE 2 are artificially considered to be poorer than they really are (step 14). Of course, the reduction in the CQI_group, i.e. the choice of a CQI_group relative to lower CQI values, is only possible if the CQI_group obtained in step 11 is not already the CQI_group_min group corresponding to the lowest CQI values. This verification is advantageously carried out in step 13.

If the group obtained in step 11 is CQI_group_min, the transmission power of the HS-SCCH cannot then be increased to obtain acceptable values for $\tau_{Ack/Nack}$, and so the UE 2 is not served during the next transmission time interval of the HS-SCCH channel (step 17). The base station 1 then prioritizes a UE 3, other than the UE 2, for the next transmission time interval of the HS-SCCH concerned.

It must be noted that a power P$_{HS-DSCH}$ can be calculated for the HS-DSCH channel associated with the HS-SCCH before calculating P$_{HS-SCCH}$, for example according to the principles described below. In this case, having then established that the transmission power of the HS-SCCH channel cannot be increased, it can then be decided to reduce the power P$_{HS-DSCH}$ in order to be able to allocate the required power to the HS-SCCH channel.

In step 15, P$_{HS-SCCH}$ is calculated according to the CQI_group obtained in step 14 (or in step 11, if $\tau_{Ack/Nack}$ is above the threshold). In fact, a power margin in relation to the transmission power on the pilot channel CPICH corresponds to each CQI_group, i.e. to each predefined group of CQI values, as indicated above. P$_{HS-SCCH}$ is therefore obtained by adding a margin corresponding to the CQI_group obtained for the UE 2 to this transmission power on the CPICH.

This mechanism ensures that the HS-SCCH channel is actually detected by the UE 2, even if the latter supplies unreliable CQI values, provided that the values for the $\tau_{Ack/Nack}$ rate are acceptable.

A check is then carried out in step 16 to make sure that the calculated power P$_{HS-SCCH}$ is not greater than the maximum power P$_{HSDPA}$ which is to be allocated by the base station 1 and which corresponds to a power remaining in the base station 1 prior to allocation of power to the HSDPA channels of the user concerned. If P$_{HS-SCCH}$ for the user concerned is greater than $P_{HSDPA}$ and/or $P_{HSDPA\_control}$, this means that the power remaining in the base station 1 is not sufficient to enable the HS-SCCH channel to be transmitted at the calculated power $P_{HS-SCCH}$. Consequently, the UE 2 cannot then be served (step 17), and the corresponding HS-SCCH resources can then be allocated to a UE 3, different from the UE 2.

Conversely, if $P_{HS-SCCH}$ is not greater than $P_{HSDPA}$ or $P_{HSDPA\_control}$, a new power remaining in the base station 1 is derived from the calculated power $P_{HS-SCCH}$ (step 18). This remaining power, which can be denoted as $P_{remaining}=P_{HSDPA}-P_{HS-SCCH}$, constitutes a higher limit for the power to be allocated to the HS-DSCH channel associated with the HS-SCCH channel.

Figure 4:
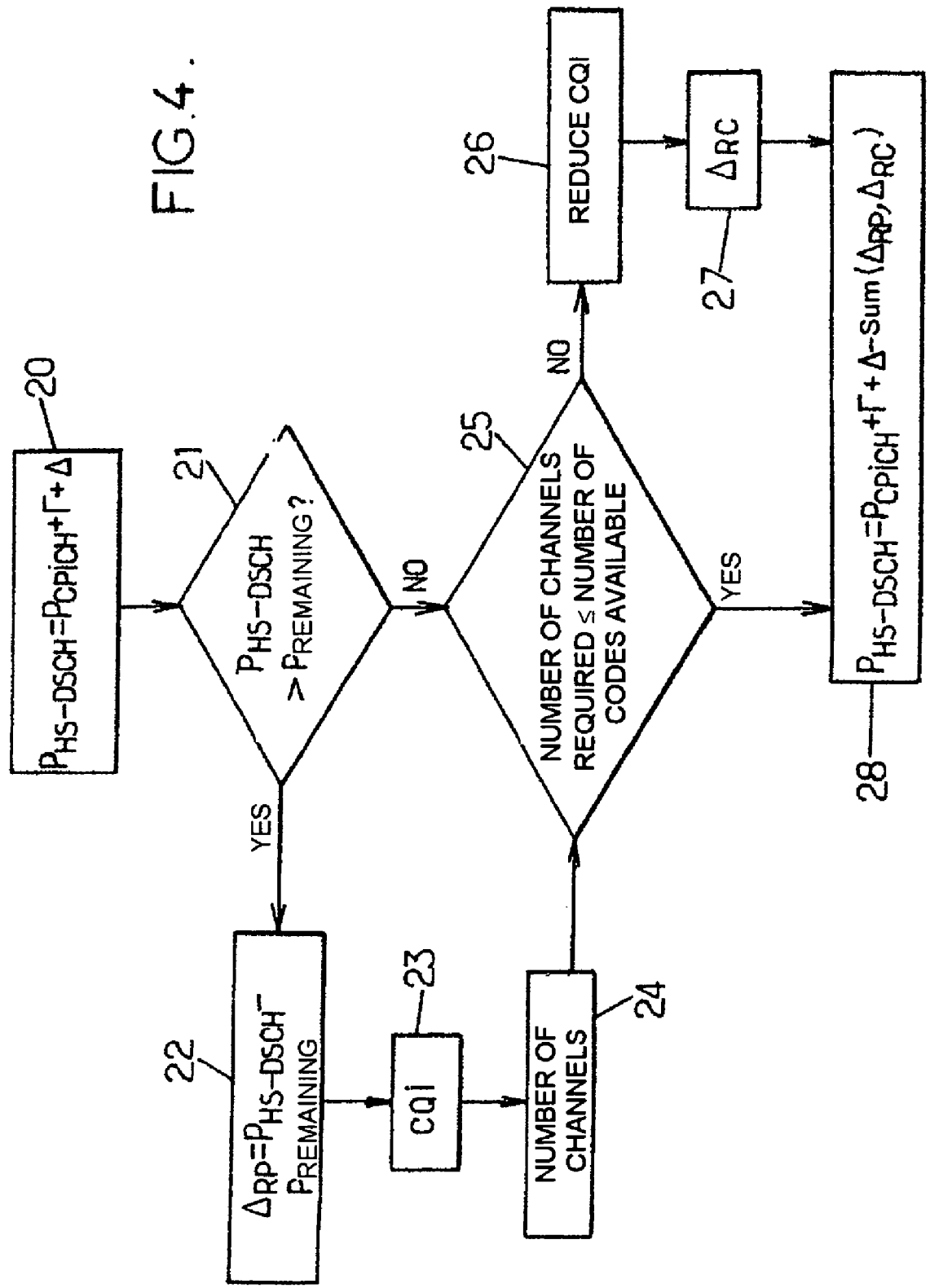
FIG. 4 is a flow chart showing a method for controlling the power on an HS-DSCH channel according to the invention.

FIG. 4 shows an example of the determination of a transmission power $P_{HS-DSCH}$ for the HS-DSCH channel when the transmission power $P_{HS-SCCH}$ of the HS-SCCH channel associated with this HS-DSCH has been previously determined, for example according to the mechanism described above with reference to FIG. 3. The transmission power for the HS-DSCH channel is understood to be the transmission power which is to be shared equally among the HS-PDSCH physical channels on which the HS-DSCH transport channel will be multiplexed, this transmission power corresponding to a transmission over a next transmission time interval of these HS-PDSCH channels.

In step 20, a first estimation $P_{HS-DSCH}$ according to the formula $P_{HS-DSCH}=P_{CPICH}+\Gamma+\Delta$ is calculated, where $P_{CPICH}$ represents the transmission power on the pilot channel CPICH, where $\Gamma$ is a parameter referred to as the "Measurement Power Offset" which is communicated to the base station 1 by a base station controller and which corresponds to a power margin in relation to the power on the CPICH, and $\Delta$ is a parameter referred to as the "Reference Power Adjustment", the value of which depends on the CQI supplied by the UE 2 and on the category of this UE. These parameters and the above formula are defined in section 6A.2 of the aforementioned technical specification 25.214. In particular, the value of $P_{HS-DSCH}$ calculated according to the preceding formula is used by the UE 2 as a reference value for its CQI calculation.

In step 21, this first estimation of the $P_{HS-DSCH}$ calculated in step 20 is compared with the value $P_{remaining}$, for example obtained in step 18 described above. If $P_{HS-DSCH}$ is greater than $P_{remaining}$, this means that the transmission power on the HS-DSCH must be reduced in relation to the initial estimation made thereof, otherwise the HS-DSCH will not be able to be transmitted to the UE 2.

For this purpose, a power reduction to be applied to the first estimation of the $P_{HS-DSCH}$ calculated in step 20 is determined in order to reduce said estimation to a level less than or equal to $P_{remaining}$. This power reduction $\Delta_{RP}$ is calculated as the following difference: $\Delta_{RP}=P_{HS-DSCH}-P_{remaining}$ (step 22).

The reduction in the transmission power on the HS-DSCH channel is accompanied by a CQI reduction in order to maintain the quality of service. In fact, maintenance of the CQI despite a power reduction on the HS-DSCH would require an increase in transmission reliability. The aforementioned technical specification 25.214 indicates that a reduction in the level of the CQI corresponds to a difference of around 1 dB in the power of the HS-DSCH. A new CQI is therefore determined in step 23 on the basis of the $\Delta_{RP}$ value obtained, this new CQI being $\Delta_{RP}$ levels below the CQI supplied by the UE 2. It must be noted that, if $\Delta_{RP}$ does not have an integral value when it is expressed in dB, the $\Delta_{RP}$ is advantageously taken in its entirety, possibly to within 1 dB, to calculate the new CQI value in step 23.

Moreover, a number of physical channels on which the HS-DSCH can be multiplexed corresponds to each CQI value. The aforementioned technical specification 25.214 provides in particular that this correspondence is held in a correspondence table stored in the base station. Therefore, having calculated a new CQI value for the UE 2, the base station 1 derives a number of HS-PDSCH physical channels from this CQI, for example on the basis of a correspondence table of this type (step 24).

At the end of the preceding steps, in particular step 22, the transmission power calculated for the HS-DSCH channel should be less than or equal to the power $P_{remaining}$.

Once $P_{HS-DSCH}$ is equal to or less than $P_{remaining}$, a check is carried out, in a step 25, to establish whether the number of HS-PDSCH physical channels required to transmit data destined for the UE 2 is less than or possibly equal to the number of HSDPA resources available in the base station 1, i.e. to the number of "channelization" codes available for the HS-PDSCH channels. If this condition is verified, the base station 1 will be able to serve the UE 2 according to the maximum number of resources required, and it will not then be necessary to modify the previously calculated power for the HS-DSCH channel, i.e.: $P_{HS-DSCH}=P_{CPICH}+\Gamma+\Delta-\Delta_{RP}$.

Of course, the number of codes available in the base station 1 must then not be zero, otherwise the absence of available resources will prevent the UE 2 from being served during the next transmission time interval of the HS-DSCH.

If, on the other hand, the number of required HS-PDSCH channels is greater than the number of channelization codes remaining for HS-PDSCH channels, it will not be possible to serve the UE 2 according to the maximum number of resources required. The value of CQI is then reduced to match the number of codes available in the base station 2 according to the correspondence predefined in the correspondence table mentioned above (step 26).

As in the case described above, this CQI reduction entails a power reduction for the HS-DSCH channel denoted as $\Delta_{RC}$ (step 27) in order to maintain the quality of service. The value of $\Delta_{RC}$ in dB corresponds to the number of levels by which the CQI is reduced.

The transmission power finally obtained, in step 28, for the HS-DSCH channel may be expressed as follows: $P_{HS-DSCH}=P_{CPICH}+\Gamma+\Delta-\text{Sum}(\Delta_{RP},\Delta_{RC})$. This power must then be distributed equally among the different physical channels required.

The number of HS-PDSCH physical channels on which the HS-DSCH will be multiplexed during the next transmission time interval concerned, and among which the power $P_{HS-DSCH}$ obtained in step 28 will be shared, may furthermore undergo an additional adjustment. The power transmitted by each HS-PDSCH channel is in fact determined by taking account once more of information relating to acknowledgements returned to the base station 1 by the UE 2 according to the mechanism described above.

Figure 5:
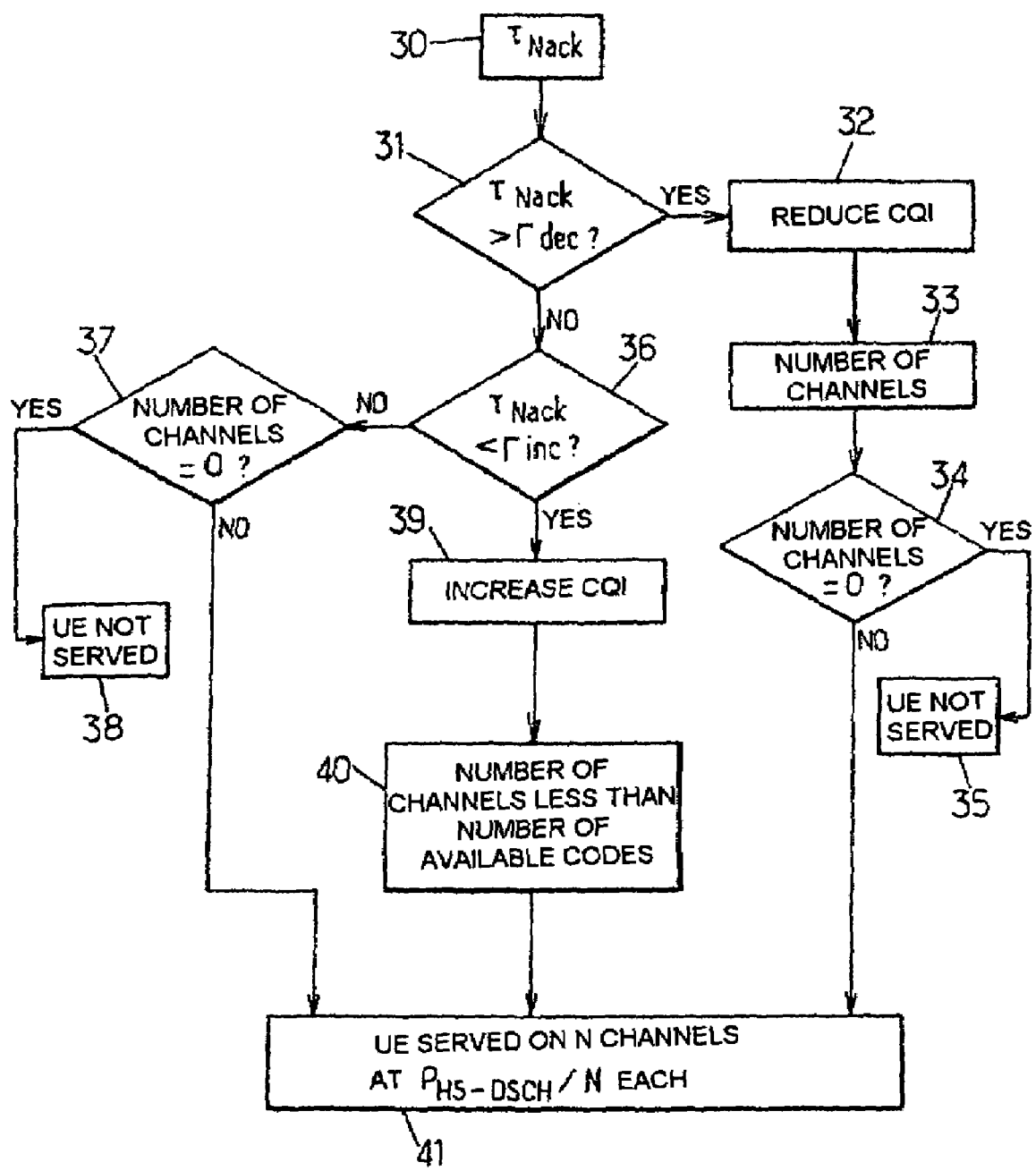
FIG. 5 is a flow chart showing a method for controlling the power on each HS-PDSCH physical channel according to the invention.

FIG. 5 shows an embodiment which is intended to determine the number of HS-PDSCH physical channels to be used during the next transmission time interval, and also the transmission power of each HS-PDSCH physical channel.

According to this embodiment, a statistical value relating to the acknowledgement mechanism described above is determined, in step 30. In the example shown in FIG. 5, this value is a mean rate $\tau_{Nack}$ of negative acknowledgements (Nack) received at the base station 1 from the UE 2, over a sufficiently representative observation period, for example according to a sliding observation window mechanism. The aforementioned technical specification 25.214 states that such a rate must be of the order of 10%.

In step 31, a check is carried out to ascertain whether $\tau_{Nack}$ is greater than a first threshold $\Gamma_{dec}$. If so, this means that the proportion of information previously transmitted on the HS-DSCH and negatively acknowledged by the UE 2 is high, and therefore that the power per useful bit is probably too weak. Since the total allocated power $P_{HS\text{-}DSCH}$ has been defined, for example according to the mechanism shown in FIG. 4 described above, it is therefore expedient to reduce the number of useful bits to be transmitted, corresponding to a change in the transport format. Each transport format which defines a number of useful bits per transport block corresponds to a CQI value, this correspondence being advantageously held in a correspondence table stored in the base station, as stipulated in the aforementioned technical specification 25.214.

Thus, if $\tau_{Nack}$ is greater than $\Gamma_{dec}$, the value of the CQI previously obtained is reduced in order to reduce the size of the transport blocks on the HS-DSCH (step 32). This reduction may comprise a step-by-step reduction in the CQI, or indeed by an integral number of steps greater than 2. In the latter case, the integral number may depend on the difference between the values of $\tau_{Nack}$ and $\Gamma_{dec}$. If the CQI reduction carried out in step 32 is not sufficient to obtain acceptable values for $\tau_{Nack}$, step 32 may be performed several times in succession until a satisfactory CQI value is obtained. The last CQI value obtained must of course remain within the CQI value range defined by the aforementioned technical specification 25.214, i.e. it must remain greater than or equal to the smallest CQI value provided (CQI=0), otherwise the UE 2 will not be able to be served.

A corresponding number of HS-PDSCH physical channels is derived from the new CQI value obtained in step 32, for example with the aid of a correspondence table as mentioned above and provided for in the aforementioned technical specification 25.214 (step 33).

A check is then carried out in step 34 to ensure that this number N of channels obtained is not zero, otherwise this will mean that no resource will be allocated to the UE 2 for the next transmission time interval, and therefore the UE 2 will not be able to be served during this transmission time interval.

If, unlike the case envisaged above, step 31 reveals that $\tau_{Nack}$ is less than $\Gamma_{dec}$, $\tau_{Nack}$ is compared with a second threshold $\Gamma_{inc}$, which is advantageously less than $\Gamma_{dec}$ (step 36). If $\tau_{Nack}$ is greater than $\Gamma_{inc}$ but less than $\Gamma_{dec}$, its value is considered to be satisfactory and resources can then be allocated to the UE 2, the number of allocated resources being determined by the CQI value previously obtained, for example during the determination of the total power $P_{HS\text{-}DSCH}$. It is of course advantageously appropriate to check in step 37 that the number N of HS-PDSCH channels involved is not zero, otherwise the UE 2 will not be served during the next transmission time interval (step 38).

If step 36 reveals that $\tau_{Nack}$ is less than $\Gamma_{inc}$, this means that the proportion of information transmitted on the HS-DSCH, destined for the UE 2 which is subject to negative acknowledgements is too low, and therefore the power per useful bit on the HS-DSCH is too high. It is therefore appropriate to increase the size of the transport block, i.e. the number of useful bits in the HS-DSCH, without limiting the transmission power on the HS-DSCH.

For this purpose, the CQI value previously obtained is increased, in a step 39. A number N of required HS-PDSCH channels corresponds to this new CQI value. This number must be less than the number of resources available in the base station 1 so that the UE 2 can be correctly served.

Once the number N of HS-PDSCH channels has been determined according to the mechanism described above, it is then possible to calculate the transmission power for each HS-PDSCH physical channel over the next transmission time interval (step 41). This transmission power is advantageously the same for each HS-PDSCH channel and may be expressed as follows: $P_{HS\text{-}PDSCH} = P_{HS\text{-}DSCH}/N$.

In an advantageous manner, a transmission is then carried out on the HS-SCCH channel(s) and on the HS-PDSCH channel(s) with the respective transmission powers calculated according to the mechanisms described above, during the corresponding transmission time intervals for each of these channels.

The same method steps are then advantageously carried out once more in order to determine the transmission power on the different shared HSDPA downlink channels for subsequent corresponding transmission time intervals, for the purpose of a transmission intended for one or, if resources permit, several UEs from among the UE 2 and the UE 3s, for which it is provided to allocate HSDPA resources during said transmission time intervals.

In an advantageous manner, the different steps described above are carried out within the base station 1. However, it is also possible to provide that a certain number of said steps are carried out in a different entity, for example in a base station controller to which the base station 1 is connected.

In one embodiment of the invention, the different steps of the method are furthermore carried out during an execution of corresponding instructions of a computer program. Said program may, for example, be executed by software means of the base station 1 considered in the example described above.

The invention claimed is:

1. A method for controlling transmission power on communication channels in a radiocommunication system comprising at least one base station designed to transmit, in successive transmission time intervals, blocks destined for radio terminals, on communication channels shared among the radio terminals, the shared communication channels comprising traffic channels and control channels associated with traffic channels, whereby at least some of the blocks transmitted by the base station produce positive or negative acknowledgements from the radio terminals, the method comprising the following steps in relation to a radio terminal which is capable of receiving blocks on at least one traffic channel and one control channel associated with said traffic channel, during a next corresponding transmission time interval for each channel:

determining at least one quality indication relating to said traffic channel;

determining at least one quantity relating to acknowledgements previously transmitted to the base station; and calculating a transmission power on at least one of the traffic channel or the control channel associated with said traffic channel, for said next corresponding transmission time interval, from said quality indication relating to the traffic channel and said quantity relating to acknowledgements previously transmitted to the base station.

2. The method as claimed in claim 1, in which the traffic channel is suitable for high-speed data transmission.

3. The method as claimed in claim 1, in which a transmission power on the traffic channel and a transmission power on the control channel associated with said traffic channel are calculated, and in which a transmission is furthermore carried out, destined for said radio terminal, on the traffic channel and on the control channel associated with said traffic channel, at the corresponding calculated transmission power during said next corresponding transmission time interval for each channel, said transmission being implemented in a selective manner if the sum of the transmission power on the traffic channel and the transmission power on the control channel associated with said traffic channel is less than a predetermined transmission power on the next corresponding transmission time interval for each channel.

4. The method as claimed in claim 3, in which the transmission destined for said radio terminal on the control channel associated with said traffic channel, at the corresponding calculated transmission power, during said next corresponding transmission time interval, is implemented in a selective manner moreover if the sum of the transmission power on the traffic channel and the transmission power on the control channel associated with said traffic channel is less than a predetermined transmission power over the transmission time interval immediately preceding said next corresponding transmission time interval.

5. The method as claimed in claim 4, in which said predetermined transmission power is a power remaining in the base station following allocation of power to channels already assigned.

6. The method as claimed in claim 3, in which the transmission power on the control channel associated with said traffic channel is calculated for said next corresponding transmission time interval, then the transmission power on said traffic channel is calculated for said next corresponding transmission time interval, the transmission power on said traffic channel being calculated to be less than or equal to the difference between the predetermined transmission power and the transmission power calculated on the control channel associated with said traffic channel.

7. The method as claimed in claim 6, in which the determination of the quality indication relating to said traffic channel and the calculation of the transmission power on said traffic channel furthermore take account of a difference between a reference power and said difference between the predetermined transmission power and the transmission power calculated on the control channel associated with said traffic channel.

8. The method as claimed in claim 6, in which a number of physical channels on which the traffic channel can be multiplexed is derived from the determined quality indication relating to the traffic channel, according to a predefined correspondence table, and in which the determination of the quality indication relating to said traffic channel and the calculation of the transmission power on said traffic channel for said next corresponding transmission time interval furthermore take account of a comparison between said number of physical channels on which the traffic channel can be multiplexed and a number of physical resources available in the base station for said next transmission time interval.

9. The method as claimed in claim 6, in which the determination of at least one quantity relating to acknowledgements comprises the determination of a rate of negative acknowledgements previously transmitted to the base station by said radio terminal over an observation period, and in which the determination of the quality indication relating to said traffic channel takes account of said rate of negative acknowledgements previously transmitted to the base station by said radio terminal.

10. The method as claimed in claim 9, in which a number of physical channels on which the traffic channel is to be multiplexed is derived from the determined quality indication relating to the traffic channel, according to a predefined correspondence table, and in which the calculated transmission power is shared more or less equally among said physical channels for said next transmission time interval corresponding to the traffic channel.

11. The method as claimed in claim 1, in which the determination of at least one quantity relating to acknowledgements previously transmitted to the base station comprises the determination of a rate of blocks which have been subject to an acknowledgement from said mobile terminal over an observation period.

12. The method as claimed in claim 11, in which the determination of the quality indication relating to said traffic channel takes account of said rate of blocks which have been subject to an acknowledgement from said mobile terminal over an observation period.

13. The method as claimed in claim 12, in which the transmission power on the control channel associated with said traffic channel for the next corresponding transmission time interval is calculated by adding a margin derived from said determined quality indication to the transmission power predetermined on a pilot communication channel.

14. The method as claimed in claim 1, in which the determination of the quality indication relating to said traffic channel takes account of quality information relating to said traffic channel transmitted to the base station by said radio terminal.

15. A base station, designed to transmit, in successive transmission time intervals, blocks destined for radio terminals, on communication channels shared among the radio terminals, the shared communication channels comprising traffic channels and control channels associated with traffic channels, at least some of the blocks transmitted by the base station producing positive or negative acknowledgements from the radio terminals,
the base station comprising, in relation to a radio terminal which is capable of receiving blocks on at least one traffic channel and one control channel associated with said traffic channel, during a next corresponding transmission time interval for each channel:
    means for obtaining at least one quality indication relating to said traffic channel;
    means for determining at least one quantity relating to acknowledgements previously transmitted to the base station; and
    means for calculating a transmission power on at least one of the traffic channel or the control channel associated with said traffic channel, for said next corresponding transmission time interval, from said quality indication relating to the traffic channel and said quantity relating to acknowledgements previously transmitted to the base station.

16. The base station as claimed in claim 15, in which the traffic channel is suitable for high-speed data transmission.

17. The base station as claimed in claim 15, in which said means for calculating a transmission power are arranged for calculating a transmission power on the traffic channel and a transmission power on the control channel associated with said traffic channel, the base station further comprising means for carrying out a transmission, destined for said radio terminal, on the traffic channel and on the control channel associated with said traffic channel, at the corresponding calculated transmission power during said next corresponding transmission time interval for each channel, said transmission being implemented in a selective manner if the sum of the transmission power on the traffic channel and the transmission power on the control channel associated with said traffic channel is less than a predetermined transmission power on the next corresponding transmission time interval for each channel.

18. The base station as claimed in claim 17, in which the transmission destined for said radio terminal on the control channel associated with said traffic channel, at the corresponding calculated transmission power, during said next corresponding transmission time interval, is implemented in a selective manner moreover if the sum of the transmission power on the traffic channel and the transmission power on the control channel associated with said traffic channel is less than a predetermined transmission power over the transmission time interval immediately preceding said next corresponding transmission time interval.

19. The base station as claimed in claim 18, in which said predetermined transmission power is a power remaining in the base station following allocation of power to channels already assigned.

20. The base station as claimed in claim 17, in which the means for calculating a transmission power on at least one of the traffic channel or the control channel associated with said traffic channel calculates the transmission power on the control channel associated with said traffic channel for said next corresponding transmission time interval, and then the transmission power on said traffic channel for said next corresponding transmission time interval, the transmission power on said traffic channel being calculated to be less than or equal to the difference between the predetermined transmission power and the transmission power calculated on the control channel associated with said traffic channel.

21. The base station as claimed in claim 20, in which the means for obtaining the quality indication relating to said traffic channel and the means for calculating the transmission power on said traffic channel furthermore take account of a difference between a reference power and said difference between the predetermined transmission power and the transmission power calculated on the control channel associated with said traffic channel.

22. The base station as claimed in claim 20, comprising means for deriving a number of physical channels on which the traffic channel can be multiplexed from the determined quality indication relating to the traffic channel, according to a predefined correspondence table, and in which the means for obtaining the quality indication relating to said traffic channel and the the means for calculating the transmission power on said traffic channel for said next corresponding transmission time interval furthermore take account of a comparison between said number of physical channels on which the traffic channel can be multiplexed and a number of physical resources available in the base station for said next transmission time interval.

23. The base station as claimed in claim 20, in which the means for determining at least one quantity relating to acknowledgements comprises means for determining a rate of negative acknowledgements previously transmitted to the base station by said radio terminal over an observation period, and in which the means for obtaining the quality indication relating to said traffic channel takes account of said rate of negative acknowledgements previously transmitted to the base station by said radio terminal.

24. The base station as claimed in claim 23, comprising means for deriving a number of physical channels on which the traffic channel is to be multiplexed from the determined quality indication relating to the traffic channel, according to a predefined correspondence table, and means for sharing the calculated transmission power more or less equally among said physical channels for said next transmission time interval corresponding to the traffic channel.

25. The base station as claimed in claim 18, in which the means for determining at least one quantity relating to acknowledgements previously transmitted to the base station comprises means for determining a rate of blocks which have been subject to an acknowledgement from said mobile terminal over an observation period.

26. The base station as claimed in claim 25, in which the means for obtaining the quality indication relating to said traffic channel takes account of said rate of blocks which have been subject to an acknowledgement from said mobile terminal over an observation period.

27. The base station as claimed in claim 26, in which the means for calculating the transmission power on the control channel associated with said traffic channel for the next corresponding transmission time interval adds a margin derived from said determined quality indication to the transmission power predetermined on a pilot communication channel.

28. The base station as claimed in claim 15, in which the means for obtaining the quality indication relating to said traffic channel takes account of quality information relating to said traffic channel transmitted to the base station by said radio terminal.

29. A computer program product to be installed in a base station, comprising instructions to carry out, during an execution of the program by the means of the base station, a method for controlling transmission power on communication channels in a radiocommunication system comprising at least one base station designed to transmit, in successive transmission time intervals, blocks destined for radio terminals, on communication channels shared among the radio terminals, the shared communication channels comprising traffic channels and control channels associated with traffic channels, whereby at least some of the blocks transmitted by the base station produce positive or negative acknowledgements from the radio terminals, said instructions being arranged to carry out the following steps in relation to a radio terminal which is capable of receiving blocks on at least one traffic channel and one control channel associated with said traffic channel, during a next corresponding transmission time interval for each channel:
  determining at least one quality indication relating to said traffic channel;
  determining at least one quantity relating to acknowledgements previously transmitted to the base station; and
  calculating a transmission power on at least one of the traffic channel or the control channel associated with said traffic channel, for said next corresponding transmission time interval, from said quality indication relating to the traffic channel and said quantity relating to acknowledgements previously transmitted to the base station.

30. The computer program product as claimed in claim 29, in which the traffic channel is suitable for high-speed data transmission.

31. The computer program product as claimed in claim 29, in which a transmission power on the traffic channel and a transmission power on the control channel associated with said traffic channel are calculated, and in which a transmission is furthermore carried out, destined for said radio terminal, on the traffic channel and on the control channel associated with said traffic channel, at the corresponding calculated transmission power during said next corresponding transmission time interval for each channel, said transmission being implemented in a selective manner if the sum of the transmission power on the traffic channel and the transmission power on the control channel associated with said traffic channel is less than a predetermined transmission power on the next corresponding transmission time interval for each channel.

32. The computer program product as claimed in claim 31, in which the transmission destined for said radio terminal on the control channel associated with said traffic channel, at the corresponding calculated transmission power, during said next corresponding transmission time interval, is implemented in a selective manner moreover if the sum of the transmission power on the traffic channel and the transmission power on the control channel associated with said traffic channel is less than a predetermined transmission power over the transmission time interval immediately preceding said next corresponding transmission time interval.

33. The computer program product as claimed in claim 32, in which said predetermined transmission power is a power remaining in the base station following allocation of power to channels already assigned.

34. The computer program product as claimed in claim 31, in which the transmission power on the control channel associated with said traffic channel is calculated for said next corresponding transmission time interval, then the transmission power on said traffic channel is calculated for said next corresponding transmission time interval, the transmission power on said traffic channel being calculated to be less than or equal to the difference between the predetermined transmission power and the transmission power calculated on the control channel associated with said traffic channel.

35. The computer program product as claimed in claim 34, in which the determination of the quality indication relating to said traffic channel and the calculation of the transmission power on said traffic channel furthermore take account of a difference between a reference power and said difference between the predetermined transmission power and the transmission power calculated on the control channel associated with said traffic channel.

36. The computer program product as claimed in claim 34, in which a number of physical channels on which the traffic channel can be multiplexed is derived from the determined quality indication relating to the traffic channel, according to a predefined correspondence table, and in which the determination of the quality indication relating to said traffic channel and the calculation of the transmission power on said traffic channel for said next corresponding transmission time interval furthermore take account of a comparison between said number of physical channels on which the traffic channel can be multiplexed and a number of physical resources available in the base station for said next transmission time interval.

37. The computer program product as claimed in claim 34, in which the determination of at least one quantity relating to acknowledgements comprises the determination of a rate of negative acknowledgements previously transmitted to the base station by said radio terminal over an observation period, and in which the determination of the quality indication relating to said traffic channel takes account of said rate of negative acknowledgements previously transmitted to the base station by said radio terminal.

38. The computer program product as claimed in claim 37, in which a number of physical channels on which the traffic channel is to be multiplexed is derived from the determined quality indication relating to the traffic channel, according to a predefined correspondence table, and in which the calculated transmission power is shared more or less equally among said physical channels for said next transmission time interval corresponding to the traffic channel.

39. The computer program product as claimed in claim 29, in which the determination of at least one quantity relating to acknowledgements previously transmitted to the base station comprises the determination of a rate of blocks which have been subject to an acknowledgement from said mobile terminal over an observation period.

40. The computer program product as claimed in claim 39, in which the determination of the quality indication relating to said traffic channel takes account of said rate of blocks which have been subject to an acknowledgement from said mobile terminal over an observation period.

41. The computer program product as claimed in claim 40, in which the transmission power on the control channel associated with said traffic channel for the next corresponding transmission time interval is calculated by adding a margin derived from said determined quality indication to the transmission power predetermined on a pilot communication channel.

42. The computer program product as claimed in claim 29, in which the determination of the quality indication relating to said traffic channel takes account of quality information relating to said traffic channel transmitted to the base station by said radio terminal.

* * * * *

UNITED STATES PATENT AND TRADEMARK OFFICE
CERTIFICATE OF CORRECTION

| | | |
|---|---|---|
| PATENT NO. | : 7,634,289 B2 | Page 1 of 1 |
| APPLICATION NO. | : 11/114809 | |
| DATED | : December 15, 2009 | |
| INVENTOR(S) | : Gervais et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this

Twenty-first Day of December, 2010

David J. Kappos
*Director of the United States Patent and Trademark Office*